(12) United States Patent
Krone et al.

(10) Patent No.: US 11,399,501 B2
(45) Date of Patent: Aug. 2, 2022

(54) MILK SEPARATION DEVICE

(71) Applicant: GEA Farm Technologies GmbH, Bönen (DE)

(72) Inventors: Otto Krone, Laggenbeck (DE); Gertjan Varvick, Hengelo (NL)

(73) Assignee: GEA FARM TECHNOLOGIES GMBH, Bönen (DE)

( * ) Notice: Subject to any disclaimer, the term of this patent is extended or adjusted under 35 U.S.C. 154(b) by 902 days.

(21) Appl. No.: 15/579,848

(22) PCT Filed: Jun. 17, 2015

(86) PCT No.: PCT/EP2015/063609
§ 371 (c)(1),
(2) Date: Dec. 5, 2017

(87) PCT Pub. No.: WO2016/202382
PCT Pub. Date: Dec. 22, 2016

(65) Prior Publication Data
US 2018/0153131 A1    Jun. 7, 2018

(51) Int. Cl.
| | |
|---|---|
| *A01J 11/02* | (2006.01) |
| *A01J 5/04* | (2006.01) |
| *A01J 7/02* | (2006.01) |
| *B01D 19/00* | (2006.01) |
| *B01D 19/02* | (2006.01) |

(Continued)

(52) U.S. Cl.
CPC ............... *A01J 11/02* (2013.01); *A01J 5/041* (2013.01); *A01J 5/042* (2013.01); *A01J 7/027* (2013.01); *B01D 19/0042* (2013.01); *B01D 19/02* (2013.01); *B01D 17/0211* (2013.01); *C02F 1/20* (2013.01); *C02F 1/40* (2013.01)

(58) Field of Classification Search
None
See application file for complete search history.

(56) References Cited

U.S. PATENT DOCUMENTS

| | | | |
|---|---|---|---|
| 1,972,144 A | 9/1934 | Hapgood | |
| 2,229,860 A * | 1/1941 | Mccurdy | B01D 21/0012 |
| | | | 55/395 |

(Continued)

FOREIGN PATENT DOCUMENTS

| | | |
|---|---|---|
| BE | 661573 | 7/1965 |
| CN | 1246064 C | 3/2006 |

(Continued)

OTHER PUBLICATIONS

International Search Report for International Application No. PCT/EP2015/063609 dated Feb. 15, 2016, 2 pp.

*Primary Examiner* — Clare M Perrin
(74) *Attorney, Agent, or Firm* — Patent Portfolio Builders LLC

(57) ABSTRACT

The invention relates to a milk separation device of a milking system for milking, in particular automated milking, of milk-producing animals. The milk separation device comprises a body, which has an inlet connection and an outlet connection, and a cover, which has a connection to a vacuum line. The body has an inwardly protruding balcony segment on an inner periphery, wherein the balcony segment forms a ramp helically in the peripheral direction so as to rise at a pitch angle with respect to the gravitational force of the earth.

20 Claims, 11 Drawing Sheets

(51) Int. Cl.
  *B01D 17/02* (2006.01)
  *C02F 1/20* (2006.01)
  *C02F 1/40* (2006.01)

(56) References Cited

U.S. PATENT DOCUMENTS

| | | | | |
|---|---|---|---|---|
| 3,549,292 A | * | 12/1970 | Duncan | A01J 5/041 |
| | | | | 119/14.41 |
| 3,850,814 A | * | 11/1974 | Dudley | B04B 7/04 |
| | | | | 210/298 |
| 4,537,152 A | * | 8/1985 | Thompson | A01J 5/041 |
| | | | | 119/14.54 |
| 5,052,341 A | * | 10/1991 | Woolford | A01J 5/041 |
| | | | | 119/14.2 |
| 6,161,502 A | * | 12/2000 | Simpson | A01J 5/0133 |
| | | | | 119/14.55 |
| 7,144,503 B2 | | 12/2006 | Oseroed | |
| 2005/0109716 A1 | * | 5/2005 | Leach | B01L 3/502 |
| | | | | 210/787 |
| 2009/0320760 A1 | * | 12/2009 | Torgerson | A01J 5/06 |
| | | | | 119/14.47 |
| 2016/0038952 A1 | * | 2/2016 | Noonan | B01D 21/0036 |
| | | | | 210/512.1 |

FOREIGN PATENT DOCUMENTS

| | | |
|---|---|---|
| DE | 3226022 A1 | 3/1983 |
| DE | 60107714 T2 | 2/2006 |
| EP | 0164185 A2 | 12/1985 |

\* cited by examiner

MILK SEPARATION DEVICE

CROSS REFERENCE TO RELATED APPLICATION

This application is a national phase application under 35 U.S.C. 371 of PCT Application No. PCT/EP2015/063609, filed Jun. 17, 2015, the disclosure of which is incorporated by reference herein.

FIELD AND BACKGROUND OF THE INVENTION

The invention relates to a milk separation device for a milking installation for the milking, in particular for the automatic milking, of milk-producing animals.

Milking installations, such as are used, for example, for the automatic milking of milk-producing animals, such as, for example, cows, sheep and goats, comprise milk separation devices. An automatic milking operation can be carried out by so-called milking robots. Such a milk separation device separates a liquid region from an air (vacuum) supply. In this case, so-called milk foam is prevented from penetrating into the vacuum supply. The milk foam is formed on account of the milk/air mixture as a result of air entering into the milk system (e.g. in a wanted manner by means of nozzles for better transport of the milk or in an unwanted manner as a result of leakage air between the milking cups and teats). In addition, the formation of milk foam can also be influenced by the feeding of the animals.

It is deemed disadvantageous that the formed milk foam increases in terms of volume in the milk separation device to such an extent that it is sucked up via an overflow protection unit of the vacuum supply and milk losses can occur in this way. Said risk is all the greater, the more compact the design of the separation vessel. In the case of robot systems, the goal is to use vessels that are as compact as possible. Consequently, effective foam prevention is essential.

On account of the ever-increasing demands, in particular for high throughput rates, continuous and low-maintenance operation, as well as for efficient milk yield with a simultaneous compact design, there is a constant requirement for improved milk separation devices.

SUMMARY OF THE INVENTION

Against said background, the present invention is directed to an improved milk separation device which, at the same time, is compact, prevents the formation of milk foam to a significant degree and is gentle with the milk, i.e. reduces formation of free fatty acids (FFA) in a considerable manner.

A milk separation device according to the invention for a milking installation for the milking, in particular for the automatic milking, of milk-producing animals, includes a body with an inlet connection and an outlet connection and a lid with a connection to a vacuum line. The body comprises an inwardly protruding balcony portion on an inner circumference, wherein the balcony portion forms a ramp that ascends in a helical manner in the circumferential direction at a pitch angle in opposition to the force of gravity.

The circumferentially helical balcony portion at a pitch angle forms a ramp that ascends in opposition to the force of gravity, advantageously enabling any formation of milk foam to be considerably reduced in contrast to current solutions.

Substantial reduction in over suction of too much milk foam into an overflow protection, with the resultant disadvantages of milk losses, is able to be made possible in this way.

A particular advantage of the milk separation device according to the invention consists in that the space it requires is able to be reduced compared to current realizations, at the same time it being possible to maintain milk throughput and substantially reduce formation of milk foam.

A further advantage, in this case, consists in that it is possible to prevent milk foam being sucked up into the vacuum generation, e.g. into a vacuum pump. As a result, hygiene problems as well as maintenance and cleaning costs are reduced.

In addition, turbulence of the milk is significantly avoided such that so-called free fatty acids (FFA) are not able to be formed.

The milk is sucked into the milk separation device and flows out of the inlet onto the balcony portion. As a result of the centrifugal force, the milk is pressed outward onto the container wall and consequently remains largely on the balcony. As the balcony portion ascends and the milk flows further in opposition to gravity, the flow speed of the milk is reduced. That is to say, as a result, energy for possible formation of milk foam is removed from said milk.

In one realization, the balcony portion is realized in a crescent-shaped manner. This is advantageous as in this way, the milk, once its flow speed has been reduced, can flow gently against the inside walls of the milk separation device into a collecting portion. The balcony portion comprises a transition portion, a balcony as a middle portion and a balcony edge. The transition portion and the balcony edge are advantageously rounded, as a result of which turbulence formation in the milk is avoided.

In one realization, it is provided that a balcony width of the balcony portion becomes smaller in the ascending progression of the balcony portion in dependence on a circumferential angle. In this way, the milk flow can be advantageously slowed down and calmed such that milk foam formation is considerably reduced. The more the flow speed of the milk is reduced and the balcony becomes narrower, the more milk flows downward. In addition, it is ensured in this way that inflowing milk is not swirled with following inflowing milk.

For as advantageously turbulence-free or at least low-turbulence as possible an inflow of the milk into the milk separation device, the inlet connection is mounted tangentially on the body and tangentially to the balcony portion, wherein the inlet connection communicates with an interior of the body through an inflow, wherein a lower edge of the inflow closes off with a top surface of the balcony or lies above it.

A further realization provides that the body comprises a central axis and includes an inflow portion with the tangential inlet connection, an intermediate portion, a collecting portion and a bottom portion with the outlet connection. This is advantageous as the milk flows via the inner walls of said portions into the collecting portion calmed in such a manner that the collected milk no longer comprises rotational movements in the collecting portion.

In a further realization, the inflow portion comprises a wall portion with a flange for interaction with the lid and the transition portion. This produces an advantageously compact design.

In yet another realization, it is provided that the milk separation device is provided with a level sensor for detecting a fill level of collected separated milk. Consequently, a fill level of the milk can be detected and with said information a controlled discharge or a controlled pumping-out of the milk is made possible. In this way, it is advantageously achieved that the level of the milk remains completely below the balcony in order to ensure the function of the balcony.

For example, a milk pump can be controlled by the fill level detected by the level sensor in such a manner that the milk does not exceed the determined fill level below the balcony and at the same time as continuous a pumping-out of the milk as possible can be effected.

In this connection, it is particularly advantageous when the milk pump is controlled by means of a frequency-controlled motor at a speed which can be variable as a result.

In a different realization, the level sensor is arranged at an angle to an axis of the milk separation device, wherein said angle is within a range of between 10° and 25°, in a preferred manner between 18° and 22°. A simple and compact design is consequently made possible.

It is additionally provided that the level sensor is fastened in the lid. This is an advantageously compact design.

In one realization, the pitch angle can comprise a constant value.

In an alternative realization, the pitch angle can comprise different values which alter continuously or in steps.

The advantage of an adaptation to different boundary conditions is consequently produced.

When the milk separation device is provided with at least one cleaning connection, it can be advantageously attached to an existing cleaning system in a simple manner. In this connection, it is particularly advantageous when the at least one cleaning connection is arranged in the lid as, in this way, the entire interior of the milk separation device is able to be completely cleaned from above including the level sensor, as a result of which cleaning times are shortened.

BRIEF DESCRIPTION OF THE DRAWINGS

Further advantages and details proceed from the exemplary embodiment shown in the figures of the drawing, in which.

DETAILED DESCRIPTION OF THE DRAWINGS

The terms "above", "below", "left", "right" refer to the respective arrangement in the figures.

Figure 1:
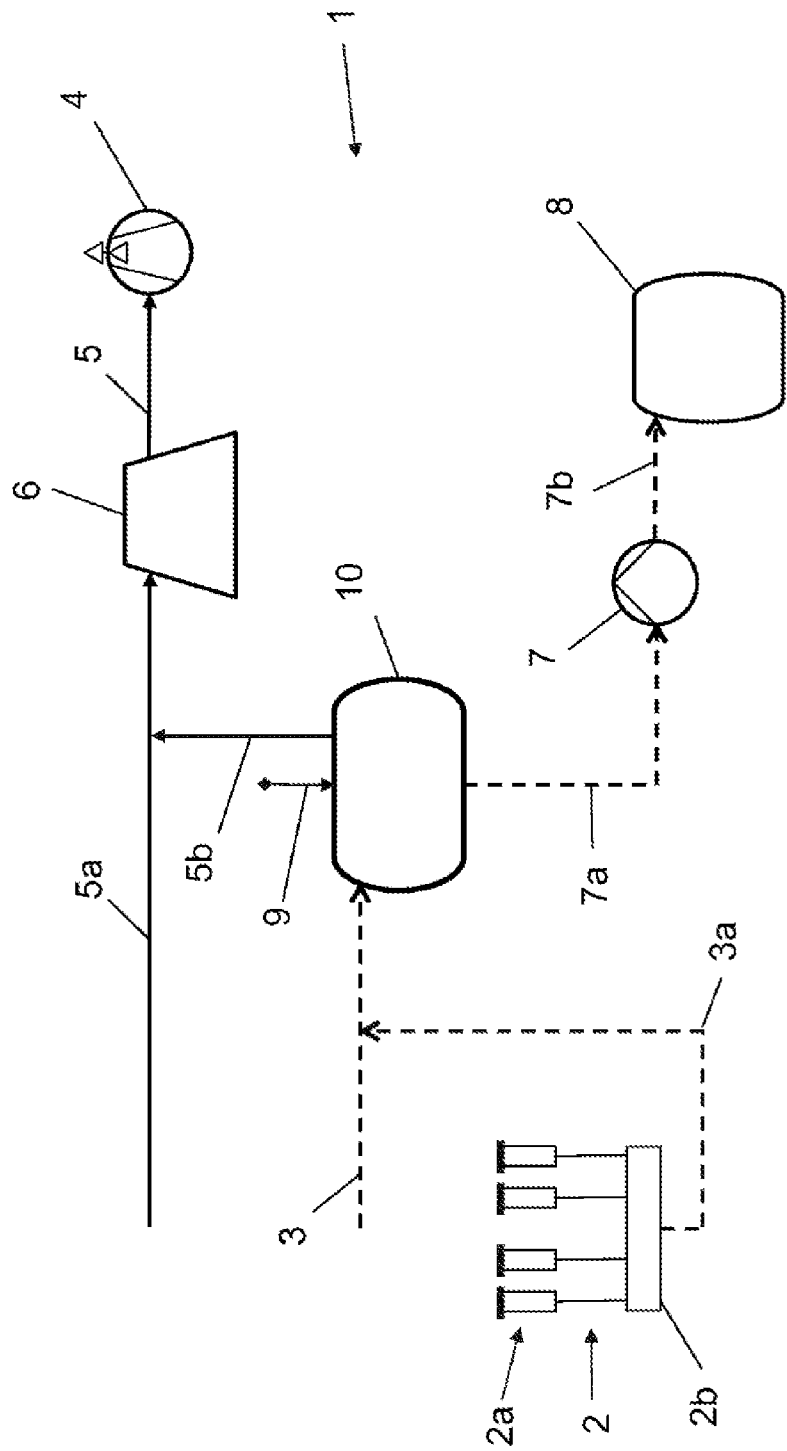
FIG. 1 shows a schematic block diagram of a milking installation as an example with a milk separation device according to the invention.

FIG. 1 shows a schematic block diagram of a milking installation 1 as an example with a milk separation device 10 according to the invention.

The milking installation 1 here includes a milking cluster 2 with teat cups 2a, a milking line 3, a vacuum generator 4, an overflow protection unit 6, a milk pump 7, a milk tank 8 and the milk separation device 10.

The teat cups 2a are connected to a collecting piece 2b. The collecting piece 2b is attached to the milking line 3 by means of a milking hose 3a. The milking line 3 opens out into the milk separation device 10 which is connected to both the main vacuum line 5 and to the milk pump 7.

The vacuum generator 4 is, for example, a vacuum pump which is attached to the main vacuum line 5. The main vacuum line 5 is connected via the overflow protection unit 6 to a vacuum line 5a, to which the milk separation device 10 is attached via a so-called air line 5b.

The milk pump 7 communicates with the milk separation device 10 via a milk feed line 7a and is attached with a milk pressure line 7b to the milk tank 8.

In the case of a milking operation, the teat cups 2a are placed onto teats of an animal to be milked (not shown). The vacuum line 5a is acted upon with a vacuum, which is generated by the vacuum generator 4, via the overflow protection unit 6 and the main vacuum line 5. The teat cups 2a are connected to the vacuum line 5a via the collecting piece 2b, the milking hose 3a, the milking line 3, the milk separation device 10 and the air line 5b. The milk which is milked by the teat cups 2a of the milking cluster 2 is conveyed into the milk separation device 10 by means of the vacuum.

The function of the milk separation device 10 consists of separating the milked milk from the vacuum supply, at the same time a formation of milk foam being suppressed and additionally a formation of free fatty acids (FFA) as a result of turbulence being avoided.

In this case, the milked milk is collected in the milk separation device 10 in a lower liquid region of the same and is conducted via the milk feed line 7a to the milk pump 7. The milk pump 7 pumps the milk obtained in this way via the milk pressure line 7b into the milk tank 8.

The overflow protection unit 6 serves for the purpose of preventing milk foam from being sucked up out of the milk separation device 10 into the vacuum generator 4 and thus of excluding extensive cleaning measures of the same.

The milk separation device 10 is provided here additionally with a cleaning connection 9, by means of which cleaning agent and/or rinsing agent can be supplied to clean the milk separation device 10. However, this will not be explained in any more detail here.

Figure 2:
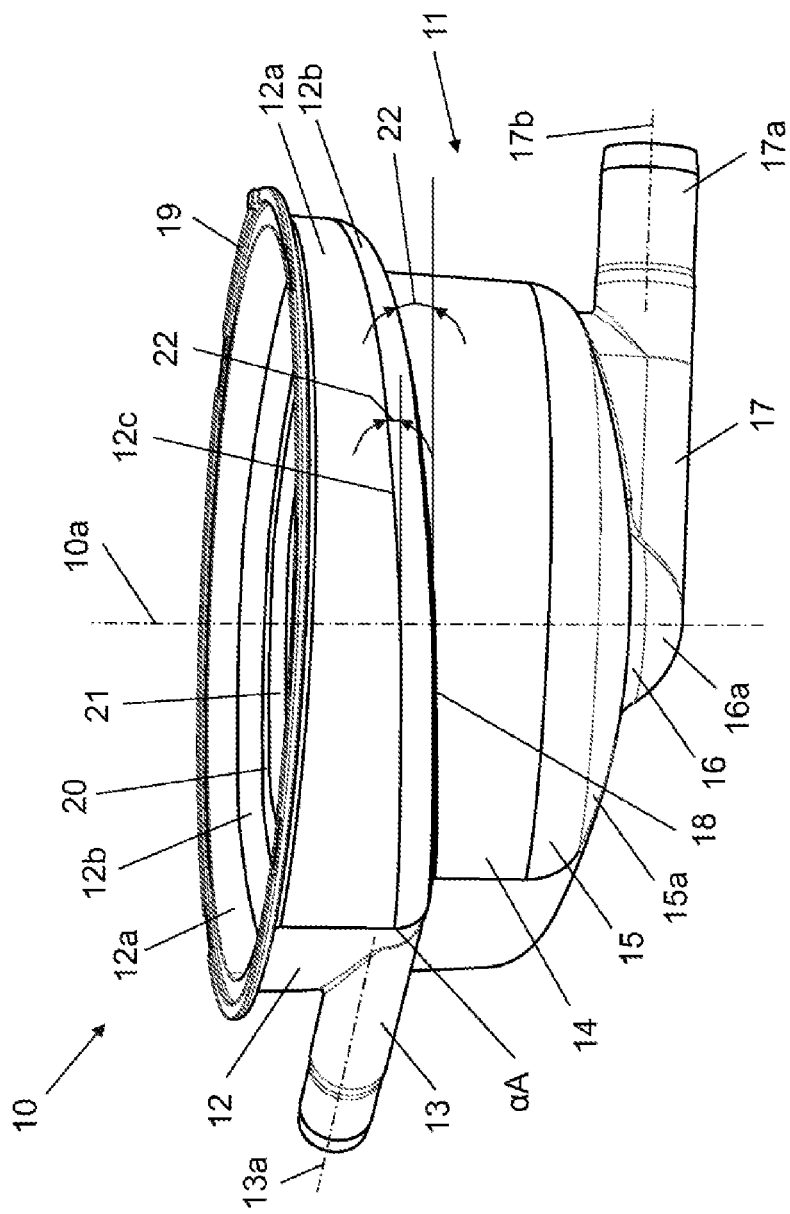
FIGS. 2-3 show schematic side representations of an exemplary embodiment of a body of the milk separation device according to the invention.
Figure 3:
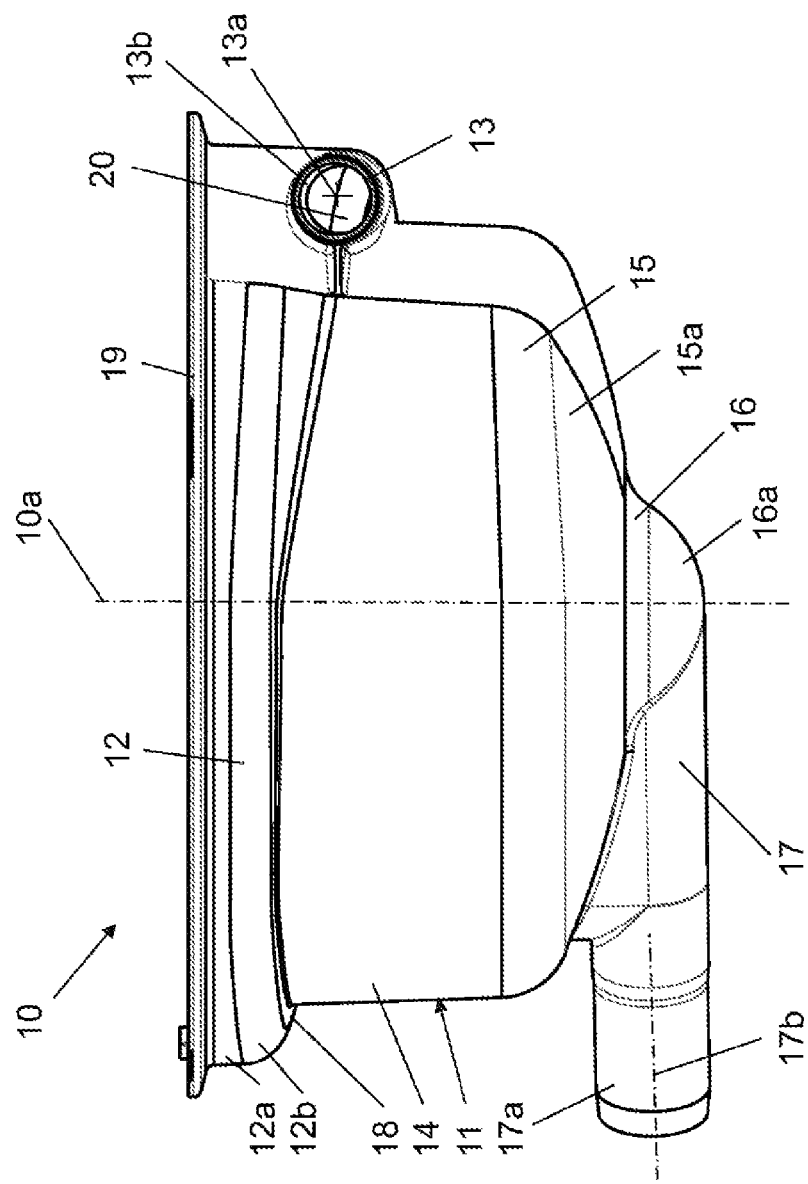
Figure 3A:
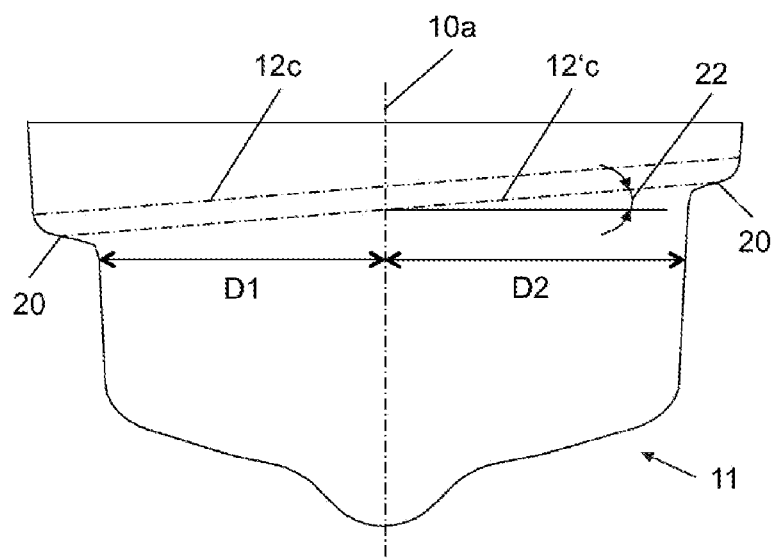
FIGS. 3a-3b show schematic radially sectioned representations of the body according to FIGS. 2-3.
Figure 3B:
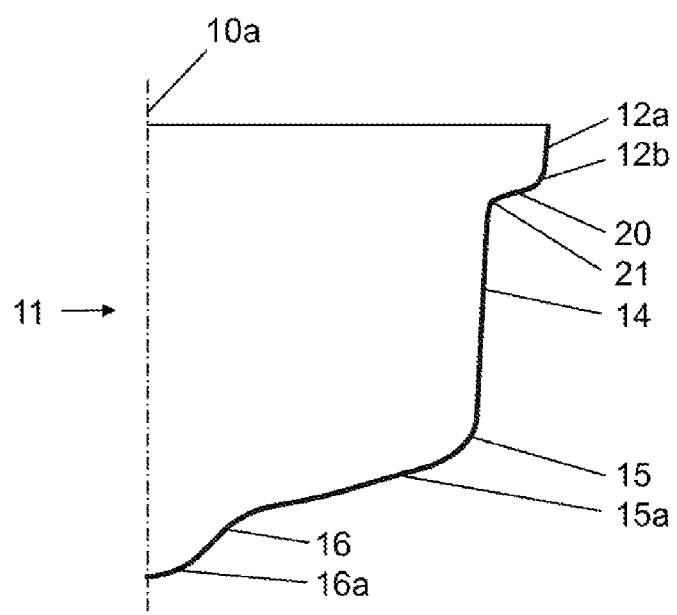
Figure 6:
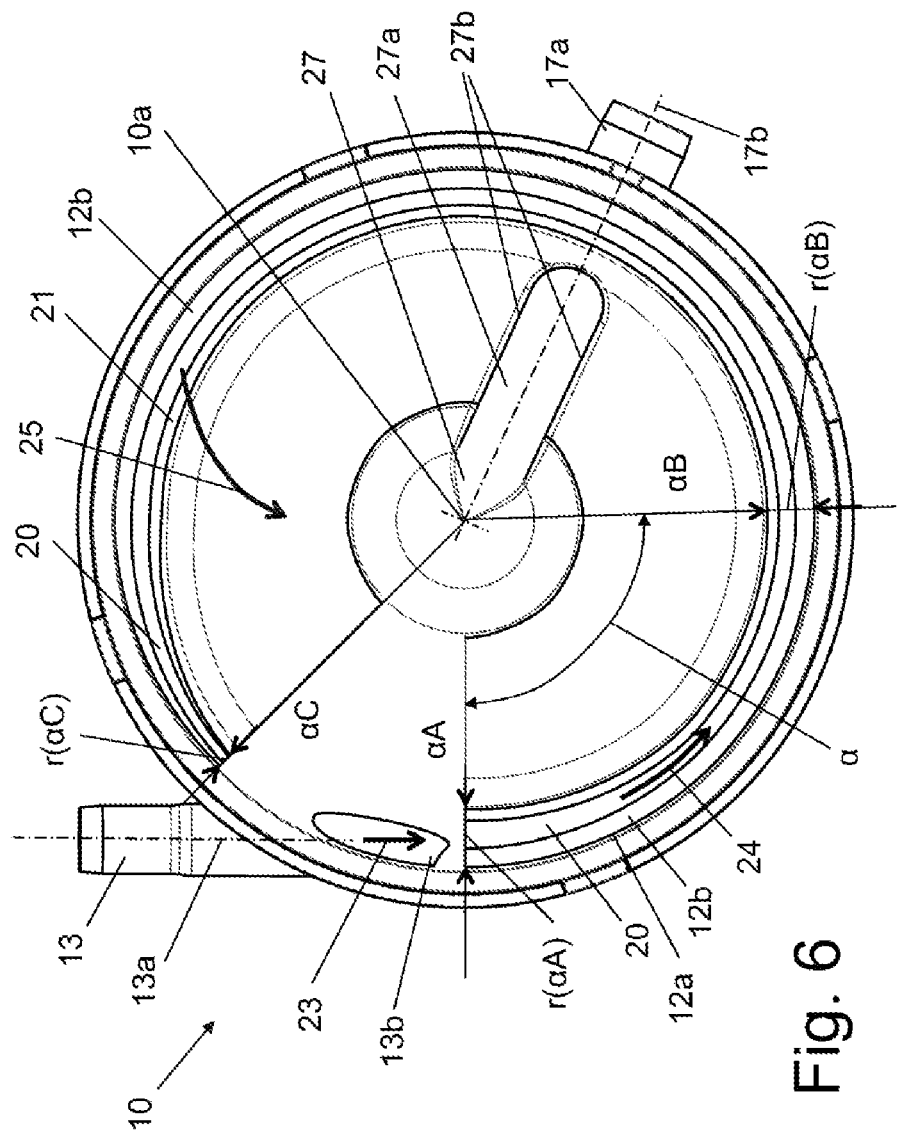
FIG. 6 shows a top view of a schematic interior view of the body according to FIGS. 2 and 3.

FIGS. 2 and 3 show schematic side representations of an exemplary embodiment of a body 11 of the milk separation device 10 according to the invention. FIGS. 3a and 3b show schematic radially sectioned representations of the body 11 according to FIGS. 2-3. FIG. 6 provides a top view of a schematic interior view of the body according to FIGS. 2 and 3.

Figure 7:
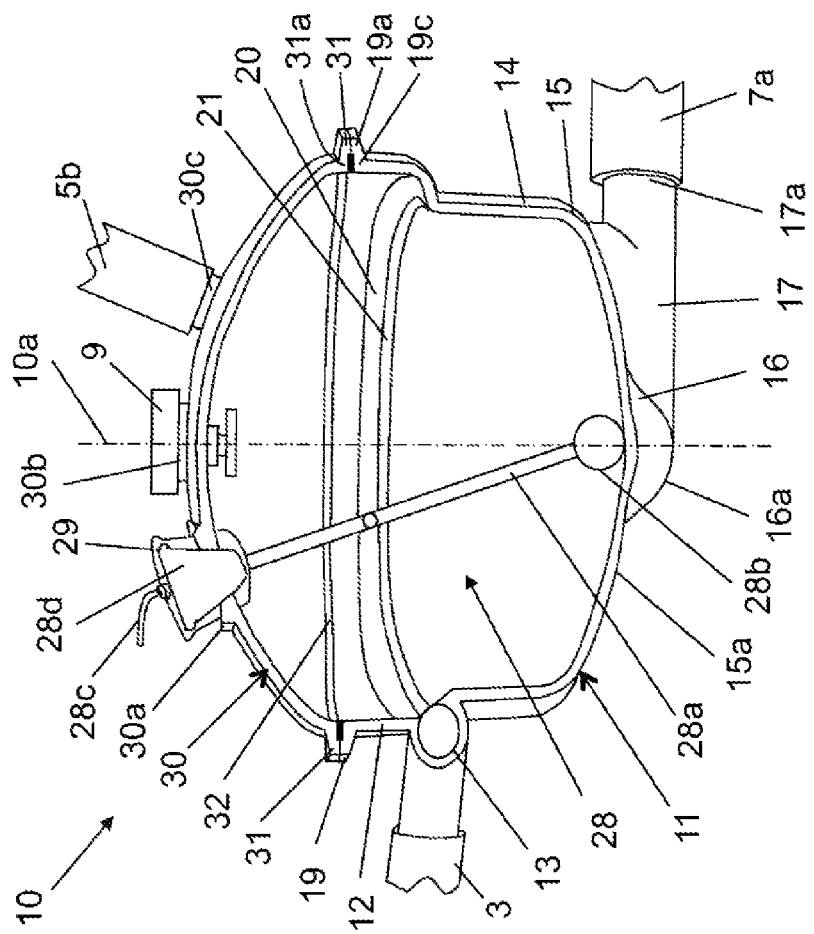
FIGS. 7-8 show schematic sectioned views of the milk separation device according to the invention.

The milk separation device 10 comprises a body 11 and a lid 30 (see FIG. 7). The body 11 is described first of all below, the lid 30 being explained further below in conjunction with FIG. 7.

The body 11 of the milk separation device 10 comprises a central axis 10a and includes an inflow portion 12 with a tangential inlet connection 13, an intermediate portion 14, a collecting portion 15 and a bottom portion 16 with an outlet connection 17.

The term "outward" means pointing away from the axis 10a, the term "inward" being understood as pointing toward the axis 10a.

The inflow portion 12 consists of a wall portion 12a, to the lower end of which is attached a transition portion 12b. The wall portion 12a is tapered slightly downward in the manner of a truncated cone shell, i.e. toward the transition portion 12b.

A flange 19, which serves for connection to the lid 30 and is explained in more detail below, is integrally formed on the upper end of the inflow portion 12, i.e. of the wall portion 12a.

The lower end of the wall portion 12a is realized in the form of an imaginary helix 12c at a pitch angle 22 and is connected to the transition portion 12b. The transition portion 12b accordingly also extends in the form of the imaginary helix 12c.

The helix 12c begins at the connection of the tangential inlet connection 13 to the inflow portion 12. Said position is specified in FIG. 2 by way of the reference αA (see FIG. 6). In this connection, α is designated as the circumferential angle about the axis 10a. In the top view shown in FIG. 6, the circumferential angle α is viewed as opening anticlockwise. The helix 12c extends from its start ascending in the direction of the upper end of the inflow portion 12 and ends after a revolution of approximately 330° at the oppositely situated connection of the tangential inlet connection 13 to the inflow portion 12 at the circumferential angle αC (see FIG. 6).

The transition portion 12b forms an inwardly protruding collar which points to the inside of the body 11 and is designated as balcony portion 18. Said balcony portion 18, which protrudes inward in such a manner, is connected to the lower end of the wall portion 12a, here by means of a rounded region of the transition portion 12. Said balcony portion 18 comprises the transition portion 12b, a middle portion which is designated here as balcony 20, and a balcony edge 21.

The balcony portion 18 with the balcony 20 extends in the above-specified manner like the transition portion 12b on the inner circumference of the inflow portion 12 in a helical manner according to the helix 12c. In this case, the balcony portion 18 with the balcony 20 forms a circumferentially ascending ramp at the pitch angle 22. In this case, the circumferential angle α of αA=0° to approximately αC=330° extends anticlockwise about the axis 10a. Said values are only given as an example.

A balcony width r(α) of the balcony 20 is dependent on the circumferential angle α. The balcony width r(α) comprises its greatest value at αA=0° and its smallest value at approximately αC=330°. The balcony width r(α) is reduced as the circumferential angle α increases. In other words, the balcony 20 becomes narrower and narrower, the further it ascends. The balcony 20, in this case, comprises the shape of a crescent.

The inlet connection 13 comprises an inflow axis 13a and is attached at the position of the inflow portion 12 at which the helix 12c begins. At said position, a length of the inflow portion 12 in the direction of the axis 10a comprises the largest value as the helix 12c begins here. The inlet connection 13 is attached tangentially on the wall of the inflow portion 12, the inflow axis 13a extending tangentially to an imaginary curved middle line of the balcony 20. An inflow 13b is formed in the wall of the inflow portion 12. The inlet connection 13 communicates with the interior of the body 11 through said inflow 13b. A lower edge of the inflow 13b closes off with a top side of the balcony 20 or lies above it.

The circumferential balcony edge 21 of the balcony 20 is rounded downward and is connected to an upper end of the intermediate portion 14. The intermediate portion 14 is designed in a similar manner to a truncated cone shell, it being tapered downward. As the intermediate portion 14 is connected by way of its upper end to the balcony edge and consequently to the crescent-shaped balcony 20, the upper end of the intermediate portion 14 is also realized in a correspondingly crescent-shaped manner. To explain this, FIG. 3b shows a roughly schematic radial cut in the body 11. The radial cut can be, for example, at the circumferential angle αB=90° according to FIG. 6.

On account of the balcony width r(α) which is dependent on the circumferential angle α, a distance D between the inside surface (e.g. as shown in FIG. 3a on the upper end of the intermediate portion 14) and the axis 10a is also dependent on the circumferential angle α. In the example shown in FIG. 3b, the distance D1 is smaller than the oppositely situated distance D2. This is caused by the varying balcony width r(α).

Additionally indicated in FIG. 3a is a helix 12'c, which is parallel to the helix 12c and, in this case, lies in the imaginary middle line of the balcony 20.

The lower end of the intermediate portion 14 can be realized, for example, in such a manner that an even distance is formed between the inner walls of the intermediate portion 14 and the axis 10a. However, this is not absolutely necessary.

A shell-like collecting portion 15 with a flatter collecting portion 15a arranged below it is mounted on the lower end of the intermediate portion 14.

A reduction in the opening width of the wall of the body 11 is effected by means of the collecting portions 15 and 15a in such a manner that an opening width of the lower end of the lower collecting portion 15a corresponds approximately to half an opening width of the upper end of the upper collecting portion 15.

The lower collecting portion 15a is connected to an upper end of a bottom portion 16. The bottom portion 16 merges at its lower end into a closed bottom portion 16a.

The outlet 17 is attached on the lower collecting portion 15a and on the bottom portions 16 and 16a in such a manner that an outlet connection 17a of the outlet 17 protrudes radially outward from the body 11 with an outflow axis 17b. The outflow axis 17b intersects the oppositely situated tangential inflow axis 13a in an imaginary extension at an angle of approximately 65° or 115°, as shown in FIG. 6.

A part radial section of the wall of the body 11 with the individual portions is shown in FIG. 3b. The term "outward" means pointing away from the axis 10a, the term "inward" being understood as pointing toward the axis 10a.

Moving from top to bottom, first of all comes the wall section 12a which is straight but extends inward at a slight inclination, to which the rounded transition portion 12b is attached. The rounding of the transition portion 12b is curved outward. A straight portion of the balcony 20 is attached to the transition portion 12b which points with its lower end to the axis 10a. The balcony 20 is inclined slightly downward here into the interior of the body 11. The balcony edge 21 is rounded downward, the rounding being curved inward, and is connected to the intermediate portion 14 which is straight but also extends inward at a slight inclination.

The intermediate portion 14 then merges into the inwardly rounded, upper collecting portion 15, to which is attached the downwardly inclined lower collecting portion 15a which extends in a substantially straight manner. The rounding of the upper collecting portion 15 is curved outward.

Finally, the bottom portions 16 and 16a are attached in an S shape, the upper bottom portion 16 being curved inward and the lower bottom portion 16a being curved outward.

Figure 4:
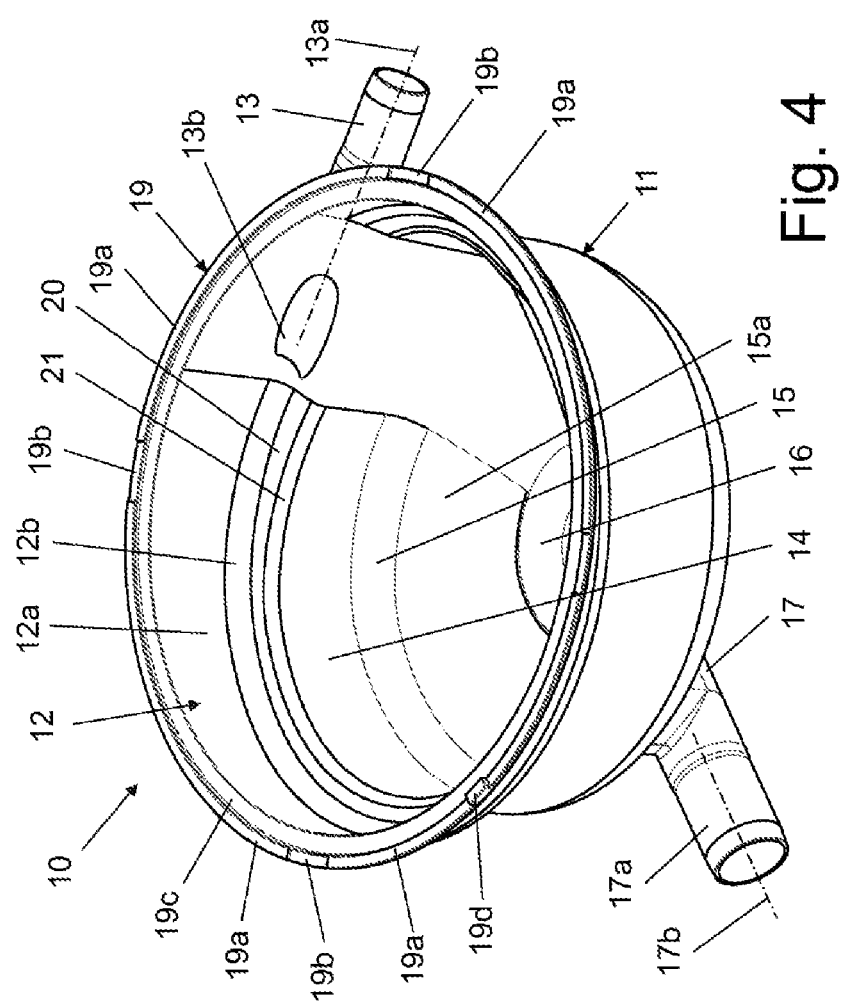
FIGS. 4-5 show schematic perspective interior views of the body according to FIGS. 2 and 3.
Figure 5:
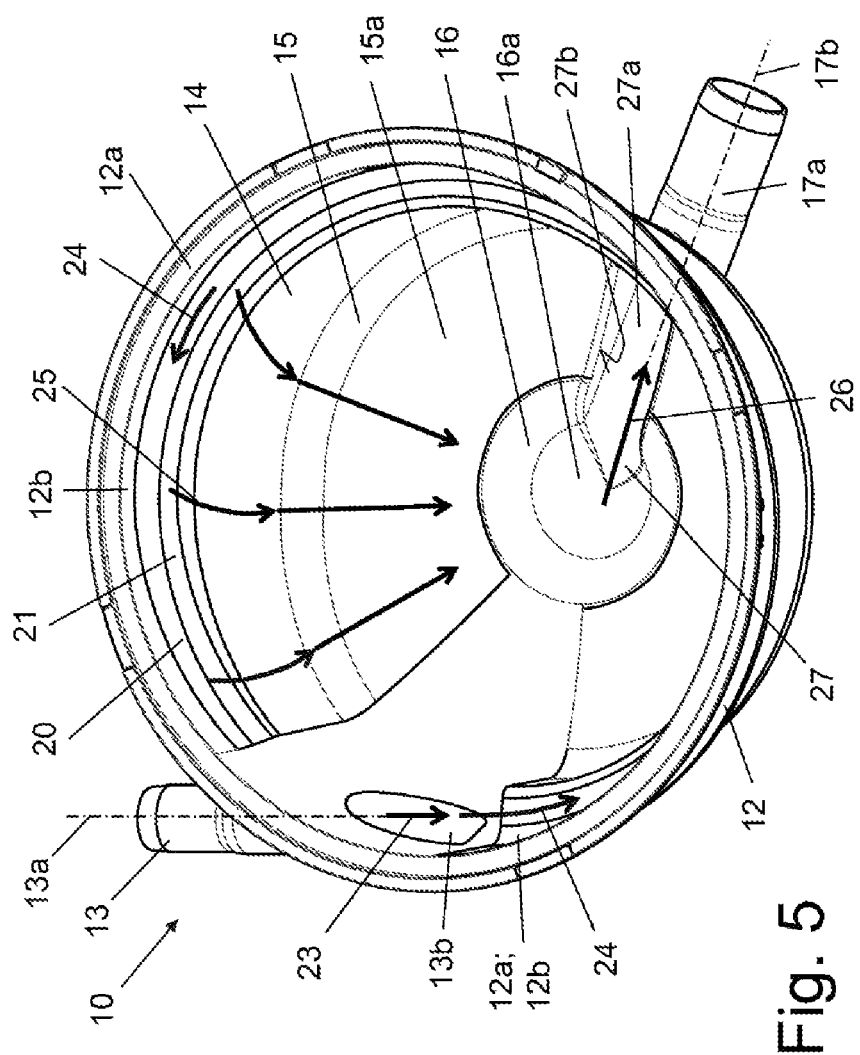

FIGS. 4-5 show schematic perspective interior views of the body 11 according to FIGS. 2 and 3. FIG. 4 shows a top view of the body 11 with representation of the flange 19. In the interior view of FIG. 5, the milk stream is illustrated from the inflow 13b to the outlet 17.

The flange 19 comprises upwardly protruding webs which are arranged uniformly on the circumference of the top surface of the flange 19. Recesses 19b are formed uniformly on the circumference between the webs 19a. At least one projection 19d is mounted on one of the webs 19a and protrudes upward from said web 19a. The webs 19a and recesses 19b form a positive locking closure for the lid 30 in its position fitted on the body 11 with webs and recesses of a flange 31 of the lid 30 (see FIGS. 7 to 9), which communicate with them and are not shown. The projection 19d serves for centering the lid 30 in the circumferential direction. The flange 19 additionally comprises a circumferential support 19c which is arranged on its inside surface and on which a seal 32 (see FIG. 7) is mounted.

FIG. 5 shows the progressions of the milk streams when the milk separation device 10 is operating. For better clarity, the lid 30 is not shown in FIG. 5. It is, however, fitted in operation, as shown in FIG. 7.

The milk separation device 10 is attached to the vacuum line 5a (see FIG. 1) via the air line 5b and is acted upon with vacuum in this way in operation.

A milk-air mixture flows out of the milking cluster 2, which is attached to the inlet connection 13, in an inflow stream 23 tangentially in the direction of the inflow axis 13a into the body 11 of the milk separation device 10. In this case, the inflow stream 23 runs through the inflow 13b in the wall of the inlet portion onto the balcony 20. In this case, the milk-air mixture of the inflow stream 23 is diverted at the wall portion 12a and the transition portion 12b into a circumferential stream 24 onto the circumference or arc of the balcony 20 and continues to run as the circumferential stream 24. As a result of the centrifugal forces generated at the same time, the milk is pressed outward onto the wall portion 12a and the transition portion 12b and thus remains largely on the balcony section 18.

As the balcony 20 ascends as described above at the pitch angle 22, the milk-air mixture flows as a circumferential stream 24 in opposition to gravity, i.e. "uphill" in opposition to the effective gravitational force. In this case, the flow speed of the circumferential stream 24 is reduced. In addition, the balcony width $r(\alpha)$ is reduced as the circumferential length or the circumferential angle $\alpha$ is reduced. As a result, as the flow speed slows down, part of the milk flows from the balcony 20 over the balcony edge 21 gently on the inner wall of the intermediate portion 14 into the collecting portion 15 and finally into the bottom portion 16, in which the milk is collected. Said streams are designated here as downward streams 25.

The more the flow speed of the circumferential stream 24 of the milk on the balcony 20 slows down and the balcony becomes narrower, the more milk flows downward in downward streams 25 into the milk below in the bottom portions 16, 16a and collecting portions 15, 15a.

The calm downward streams 25 at a slower flow speed make it possible for the milk to be collected in the collecting portions 15, 15a and bottom portions 16, 16a without turbulence and without, or with only the smallest amount of, foam formation. Said collected milk is consequently no longer in such a state of movement that causes foaming. Inflowing milk does not shoot as a jet at a high speed into the container with the collected milk, but flows slowly in part quantities into the collected milk.

When the circumferential angle $\alpha C$ (see FIG. 6) is achieved or after the complete revolution of a circumferential angle of approximately $\alpha=330°$ has been run through, all the milk has run off the balcony 20. In this way, the milk flowing along the end region of the balcony portion 18 cannot swirl with the milk flowing in through the inflow 13b.

It is ensured in this way that the milk flowing-in through the inflow 13b does not swirl with milk that flows in subsequently.

The milk pump 7 (see FIG. 1) always only pumps out the milk that has collected in the lowermost region of the body 11 in the collecting portions 15, 15a and bottom portions 16, 16a. In this case, this is a small volume of, for example, 2 l. The pumping out is effected in a controlled manner by means of a level sensor 28 (see FIG. 7) which is situated in the milk separation device 10. The milk flows, in this case, in an outflow stream 26 in an outflow 27 through a channel 27a in the outlet 17 in the direction of the outflow axis 17b through the outlet connection 17a into the milk feed line 7a to the milk pump 7.

The outflow 27 is formed radially in the lower collecting portion 15b and the bottom portions 16, 16a. The channel 27a comprises channel walls 27b for guiding the outflow stream 26.

The upper volume of the milk separation device 10, which is formed by the inlet portion 12, serves as a buffer for any milk foam that arises.

The balcony width $r(\alpha)$ is shown as an example in FIG. 6 for three circumferential angles $\alpha A$, $\alpha B$ and $\alpha C$. In said example, the transition portion 12b, the balcony 20 and the balcony edge 21 are included in the balcony width $r(\alpha)$.

The initial value $\alpha A$ of the circumferential angle $\alpha$ is shown here only as an example in order to explain the change in the balcony width $r(\alpha)$ over the range of the circumferential angle $\alpha$. The end value $\alpha C$ of the circumferential angle $\alpha$ can obviously also assume a larger or also smaller value than that shown.

Figure 8:
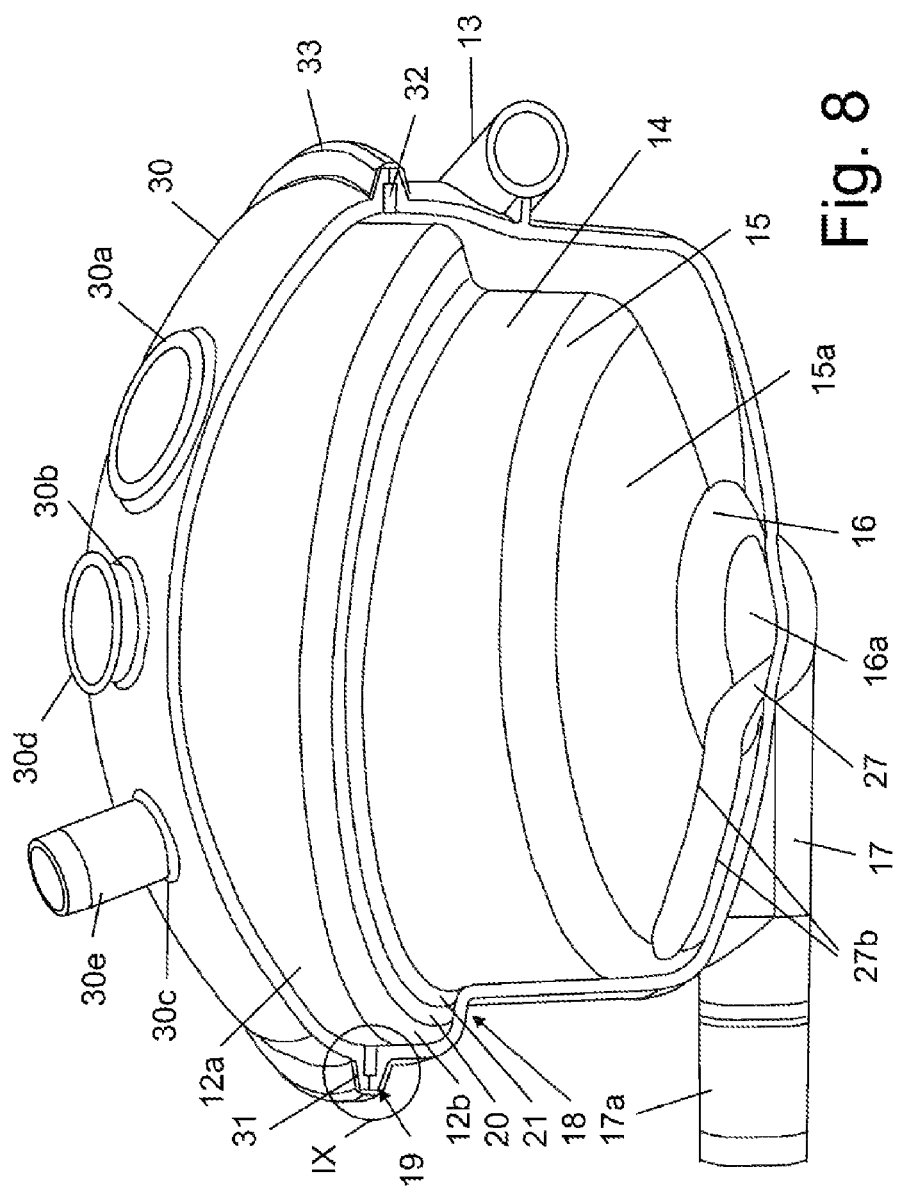
Figure 9:
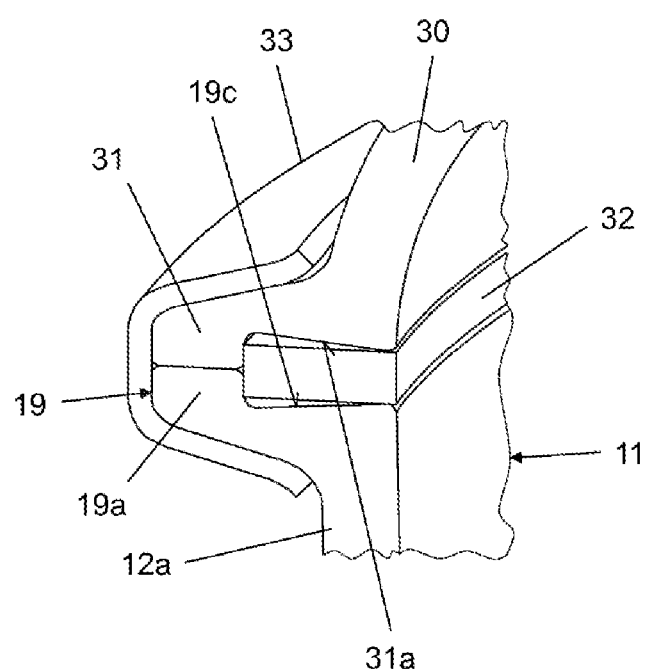
FIG. 9 shows an enlarged representation of the region IX from FIG. 8.

FIG. 7 shows a schematic sectioned view of the milk separation device 10 according to the invention. FIG. 8 shows a schematic sectioned view of the milk separation device 10 according to the invention according to FIG. 7 rotated by approximately 180° about the vertical axis 10a. FIG. 9 shows an enlarged representation of the region IX from FIG. 8.

In FIGS. 8 to 9, the lid 30, already mentioned above, is placed on the flange 19 of the inflow portion 12 of the body 11 of the milk separation device 10. In this case, the flange 31 of the lid 30 is fitted on the flange 19 and by means of the webs 19a is arranged in a positive locking manner in the correct position relative to the body 11. A circumferential seal 32, which seals the body and the lid 30 against the surrounding air, is inserted between the support 19c of the flange 19 of the body 11 and a support 31a of the flange 31 of the lid 30. The surfaces of the support 19c and of the support 31a are in each case realized slightly inclined toward one another, their inner edges resting closer together than their outer edges.

A clip element 33 or clamp element, which is not described in any more detail, is fitted onto the flanges 19 and 31, as a result of which a tight connection between the lid 30 and the body 11 is produced by means of the seal 32.

The lid 30 comprises a hood-like realization and is provided here with three openings 30a, 30b, 30c.

The first opening 30a of the lid 30 serves for receiving a level sensor 28 which is described in more detail below. The second opening 30b is arranged centrally in the lid 30 and is provided with a connecting flange 30d for the cleaning connection 9, which is not treated any further here. The third opening 30c comprises a connection 30e for the air line 5b, by means of which the milk separation device 10 is acted upon with a vacuum.

The level sensor 28 forms a detection device for detecting a fill level of the milk collected in the collecting portions 15, 15a and bottom portions 16, 16a. The level sensor 28 includes a rod 28a, a floating body 28b, a connection cable 28c and a holder 28d.

The level sensor 28 is arranged in the interior of the milk separation device 10 in such a manner that the rod 28a is arranged at an angle within the range of approximately 20° with respect to the axis 10a. The floating body 28b, in this case, is a ball which is arranged on the rod 28a so as to be displaceable in the longitudinal direction thereof and, at fill level "zero", rests in the center between the lower collecting portion 15a and the bottom portion 16.

The rod 28a is fastened in the holder 28d and is inserted tightly with said holder in the opening 30a of the lid 30. In addition, a hood-like protection element 29, which is not described in any more detail, serves for the protection and fastening of the holder 28d and of the rod 28a.

The floating body 28b, which is arranged so as to be displaceable on the rod 28a, interacts with detection means, which are located in the rod 28a, for the position of the floating body 28b on the rod 28a in order, in this way, to generate an electrical value for the fill level of the milk that has been separated and collected.

The level sensor 28 is connected via its connection cable 28d to a control device (not shown) which controls the milk pump 7 in such a manner that the milk is conveyed into the tank 8. A drive motor of the milk pump 7 is speed-controlled by means of a frequency converter and can consequently be adapted to a milk flow, the maximum value of which is, for example, between 10 and 12 l/min. It is ensured in this case that a fill level of the milk in the body 11 does not exceed an upper boundary value and does not fall below a lower boundary value.

The milk separation device is preferably realized from a transparent material, e.g. a suitable plastics material or/and glass.

The invention is not limited by the above-described exemplary embodiment, but is modifiable within the framework of the accompanying claims.

The circumferential angle α can also comprise, for example, values within the range of between 0° and 180° . . . 270°.

It is thus conceivable for the level sensor 28 to be able to be realized, for example, as a fill level sensor with ultrasound sensors or/and optical sensors.

The level sensor 28 can also comprise additional detection means for milk foam.

The invention claimed is:

1. A milk separation device comprising:
a body with a milk inlet and a milk outlet; and
an inner wall portion of the body forms an inwardly protruding balcony portion, wherein the inwardly protruding balcony portion is aligned with the milk inlet to define a helical milk flow path ascending in a circumferential direction at a pitch angle, wherein one lateral side of the balcony portion directly adjoins the inner wall portion of the body and an opposite lateral side of the balcony portion faces an open interior of the body, and wherein the balcony portion is inclined downward from the one lateral side to the opposite lateral side into the open interior of the body; and
a lid releasably joined to the body and the lid includes a vacuum line connection in fluid communication with a vacuum source and the milk inlet.

2. The milk separation device of claim 1, wherein the inwardly protruding balcony portion is substantially crescent-shaped.

3. The milk separation device of claim 1, wherein the balcony portion is substantially crescent-shaped and comprises:
a transition portion;
a balcony as a middle portion joined to the transition portion; and
a balcony edge joined to the balcony.

4. The milk separation device of claim 3, wherein a balcony width of the balcony portion becomes smaller in dependence on a circumferential angle in the ascending progression of the balcony portion to gradually restrict a radial dimension of the milk flow path.

5. The milk separation device of claim 4, wherein the milk inlet is disposed tangentially on the body and to the inwardly protruding balcony portion, wherein the milk inlet communicates with an interior portion of the body through an inflow, and a lower edge of the inflow lies above a top surface of the inwardly protruding balcony portion.

6. The milk separation device of claim 1, and further comprising:
a level sensor for detecting a fill level of collected separated milk.

7. The milk separation device of claim 6, wherein the level sensor is arranged at an angle to an axis of the milk separation device, wherein the angle is within a range of between about 10 degrees and about 25 degrees.

8. The milk separation device of claim 6, wherein the level sensor is fastened in the lid.

9. The milk separation device of claim 6, wherein the level sensor is arranged at an angle to an axis of the milk separation device, wherein the angle is within a range of between about 18° and about 22°.

10. The milk separation device of claim 1, wherein the pitch angle is a constant value.

11. The milk separation device of claim 1, wherein the pitch angle varies.

12. The milk separation device of claim 1, and further comprising:
a cleaning connection.

13. The milk separation device of claim 12, wherein the cleaning connection is arranged in the lid.

14. The milk separation device of claim 1, wherein the milk flow path is further defined by:
a milk collection portion disposed below the balcony portion and in fluid communication with the milk outlet.

15. The milk separation device of claim 1, wherein the milk flow path is further defined by an inner balcony edge of the inwardly protruding balcony portion.

16. The milk separation device of claim 1, wherein the milk flow path is further defined by:
an inner balcony edge of the inwardly protruding balcony portion; and
a milk collecting portion disposed below the inner balcony edge.

17. A milk separation device comprising:
a lid; and
a body to which the lid is releasably joined, wherein the body comprises
an inner wall;
a milk inlet;

a milk outlet;

a balcony having top side and one lateral side directly adjoining the inner wall and an opposite lateral side inwardly intruding into an interior of the body from the inner wall, wherein the balcony is inclined downward from the one lateral side to the opposite lateral side into the open interior of the body, wherein a lower edge of the milk inlet is aligned with the top side of the balcony or lies above the top side of the balcony, wherein the balcony forms a helical milk flow path ascending in a circumferential direction from a position aligned with the top side of the balcony or a position lying below the lower edge of the milk inlet; and wherein the milk outlet is below the milk inlet and the balcony.

18. The milk separation device of claim 17, wherein the body further comprises:

a collecting portion and in fluid communication with the balcony and disposed to receive milk flowing off of the balcony, and in fluid communication with the milk outlet.

19. The milk separation device of claim 18, further comprising:

a flange for interaction with the lid.

20. The milk separation device of claim 17, wherein the balcony ascends in a circumferential direction at a pitch angle, wherein the pitch angle varies.

* * * * *